(12) United States Patent
Jacobs

(10) Patent No.: X8293
(45) Date of Patent: Jul. 8, 1834

(54) PLOUGH

(76) Inventor: James Jacobs

James Jacobs, of Maysville, Kentucky.
Letters Patent.

The Schedule referred to, in these Letters Patent, and making part of the same, containing a description in the words of the said James Jacobs himself of his improvement in Ploughs.

---

To all to whom these presents shall come: Be it known that I James Jacobs of Maysville of the County of Mason, and State of Kentucky have invented a new and useful improvement in ploughs, and that the following is a full and exact description of the construction and operation of the said machine as invented or improved by me. The mould board is to be made of cast iron and the shape of the surface in its various cavities and convexities may be thus obtained; so as to present that shaped surface, to the furrow slice, which I consider as the best adapted to produce the end desired.

Fig. 1. from the extreme points of the length of the middle board, or in other words, from the point a. to b. a straight-line is to be struck, from one to the other, of six inches and one eighth, in length, and from the middle of this line, a perpendicular is to be let fall, to the surface of the mould board, which perpendicular will be one quarter of an inch and a sixteenth. a line is now to be struck from the point c. which is to be at the commencement of the thin edge of the mould board, to the point d. placed at the shoulder, on the under side for the reception of the extreme end, of the back of the shear of two inches and five eighths, in length, a perpendicular let fall from the centre of this line to the face of the mould board, will be three sixteenths of an inch in length. From the letter d. to a. a straight line is also to be struck, of, four inches, & five sixteenths in length, a perpendicular let fall, from the centre of this line to the surface of the mould board, will be full three eighths of an inch in length. and from said point c. to the hinder circular edge of the mould board, half an inch and one sixteenth.

From the point a. to the point f. a line is to be drawn of four inches and seven sixteenths in length, and a perpendicular, raised from the centre of this line to the top of the circular part of the upper edge of the mould board Drawing will be a full quarter of an inch in length - from the letter f. to the letter
B. on the front edge of the mould board, a line is to be struck of two
inches & three quarters in length, and from the centre of this line, a perpendic-
-ular let fall to the front edge of the mould board will be five sixteenths
of an inch in length. From the point d. to the point B. a line is to be
struck of Two inches, and full three sixteenths of an inch, in length - and a
perpendicular raised from the centre of this line to the thin edge of the
mould board will be a quarter of an inch in length. The portion of the
surface of the mould board contained between each point or extremity
of these original straight lines struck as above directed, is to be shaped
upon that segment or portion of a circle, as will lie between said point having
the perpendicular, for the height of the arch. The line a. B. will be the only
exception to this rule, and in this particular, that three fourths of the distance
across from a. towards B. will designate the point from which to commence the
circle proceeding on towards a. the remaining portion between the point and
B. will be described on nearly a straight line, the extremity of the point
being a little elevated. From the point K. to the point g. in fig. 2. shewing
a left hand view of the mould board, the line between these extremities
or points will be of one inch and three sixteenths in length, and another
line from the point f. to g. will be two inches and an eighth in length
the point K. is to drop one eighth of an inch, below a horizontal line drawn
from g. towards d. From the point e. to b. the length of the line, will be one
inch and three sixteenths. From the point h. to I. the length will be one
inch and fifteen sixteenths. a perpendicular is let fall from the point u. to the hori-
-zontal plane on which the flat part of the under side of the mould board
rests, designated by the point I. being that of the intersection. and another line
at right angles with it. being continued from the point I. till it intersects the
line running along the face of the slice from K. to g. parallel with the bar
at the point j. gives a line struck from I. to j. of three inches in length, which
gives the correct width of the board behind, from outside to outside.
On the back of the inside of the mould board, a flat shoulder is formed of
about two inches in length, increasing in thickness of the mould towards
the upper part to about double the width of the average thickness of the mould throughout, and thereby presents a flat surface upon which the right handle is bolted. On the line K. g. as a base, a perpendicular, is to be raised through f. to the point m, of two inches and three quarters in heighth. and another parallel to it, at one inch distant, of two inches and nine sixteenths in height. the distance from m. to o, will be a projection of one quarter of an inch forwards. The curved line of the front edge of the slice, continues its direction beyond f. about half the distance on to m, where it projects forward about one quarter of an inch and is then moulded off to the point O. thereby leaving sufficient shoulder for the hole through which the front bolt is to be fastened. On the face of the mould (Fig. 1) board the concave surface from d to e. continues in the same slope to about two thirds of the distance, above the neck over the line f. c. whence it projects forward in a concave sufficiently deep for the reception of the head, of the front bolt terminating at the top under the beam, in a sharp edge having the corners rounded off. The back part of this head, runs back about one quarter of an inch beyond the curved lines of the back part of this slice, thereby leaving space for the insertion of a hole to be cast for the reception of the end of the brace that extends from the heel of the bar to said hole in the head. This form and arrangement. presents such a shaped mould, or pattern as may be cast at one operation, together with the holes, particularly those of the head, which makes a considerable saving, in the expense of casting in the common manner, where the holes are drilled afterwards, when the pattern is in two pieces —

Fig. 3. is a view of the shear where a line from the point a. to the point c. extends to two inches and four eighths in length, and a line from c. to b, is of three inches and three eighths in length, and the distance c to e. is one inch and five eighths along the bar. The width of the shear from e to d. is two inches and three eighths, and the edge from heel to point is sharp throughout. That part between d. and f. extending in a circular form, from d to f. & the remainder of the point from f. to a. is rounded at the extremity of said point. The depth at c, in (fig. 4) of the bar is to be three eighths, and at e. it is to be three eighths and a half, and extending back to b, of the same depth. This shear and bar is to be made of wrought iron.

These proportions are reduced to one fourth of the size of a plough of full size, so that in constructing a mould of the full size of my "smaller plough" the proportions are to be increased accordingly. The stocking is to be done in the usual manner, a plough mould board, shaped on the principles above described, presents many advantages to those in common use especially for the circulation of a hard and stiff soil, such as is generally encountered in the cultivation of sugar plantations where the firm and almost wax like texture of the earth, presents difficulties that can scarcely be overcome by the plough of common construction, whereas by long experience I have been able to overcome these difficulties, by the essential differences in the formation of my mould board, which practice has shown to be that best calculated to produce the desired effect. The powerful leverage of the point takes a firm and steady hold of the earth not easily thrown out, and the furrow slice advances up the wedge shape of the shear till it is received on the concave edge of the mould, which by the great change, I have made of the several inclinations of these concavities, and convexities, gradually raises it on the face of the mould board, with the least possible friction or resistance which is calculated for, till the slice leaves the board at the hinder part, where it falls regularly over, performing its work, with the least possible friction or resistance and in the neatest manner.

My claim is particularly laid, for the formation of my mould board. according to the several lines described on the face thereof, as above described which by the assistance of the several perpendiculars let fall from them, give those parts of circles, or segments by n. according to the curves of which the various concavities and convexities of my said board are formed. I also claim for the formation of the head and neck, as giving it the advantage of being cast in one piece, with the rest of the mould board, at one operation without the necessity of a pattern made in two pieces. And more particularly because it allows of the hole for the front bolt and for the brace behind to be cast at the same time as the rest thereby making a great saving of time & expense in drilling according to the usual manner. In testimony that the above is a full and correct description of the construction and use of my plough as constructed by me.

United States Patent

Patent No.: X8293

I have hereunto set my hand this twenty-seventh day of June in the year eighteen hundred & thirty-four.

Witnesses

Henry Stone

Robt. Clarke

James Jacobs 2096 words

Exd

H.J.C.

United States Patent
Patent No.: X8293
J JACOBS.
Plow.
Patented July 8, 1834
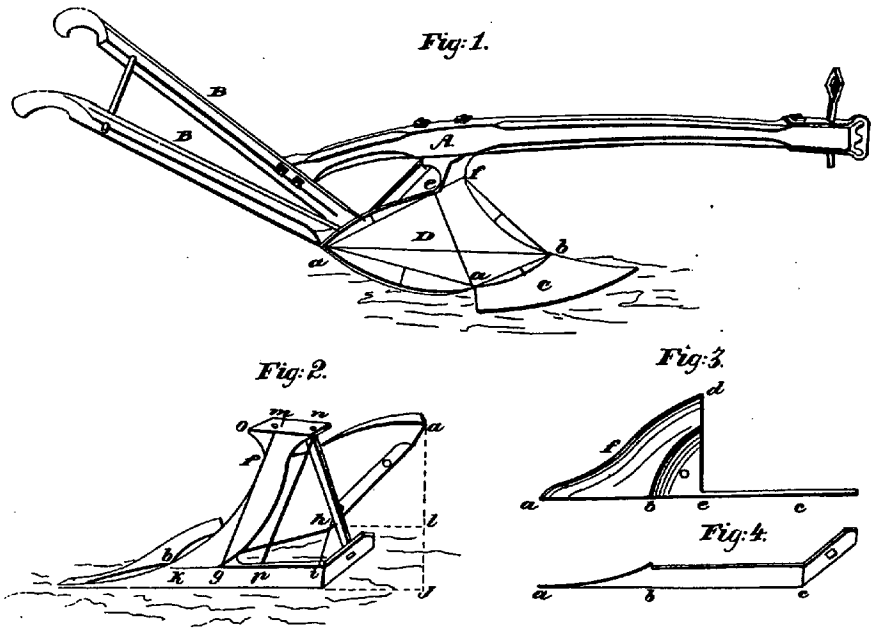
N. PETERS. PHOTO-LITHOGRAPHER, WASHINGTON, D. C.